Figure 1:
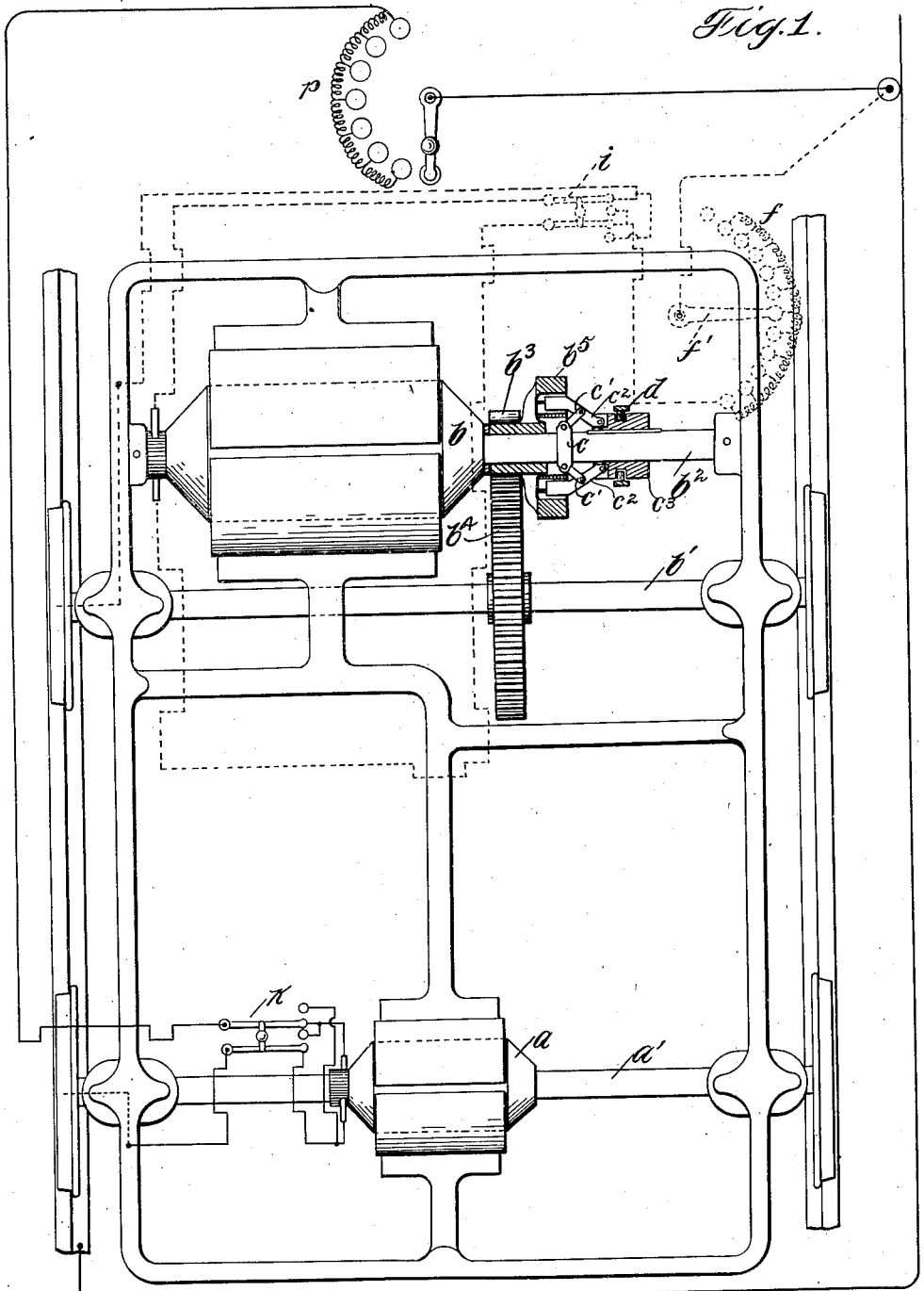
Figure 1:
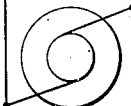

(No Model.) 3 Sheets—Sheet 1.

F. B. BADT.
ELECTRIC LOCOMOTIVE.

No. 549,485. Patented Nov. 12, 1895.

Witnesses:
George L. Cragg
W. Clyde Jones.

Inventor:
Francis B. Badt.
By Barton & Brown
Attorneys.

(No Model.) 3 Sheets—Sheet 2.

F. B. BADT.
ELECTRIC LOCOMOTIVE.

No. 549,485. Patented Nov. 12, 1895.

Witnesses:
George L. Bragg
W. Clyde Jones

Inventor:
Francis B. Badt.
By Barton & Brown
Attorneys.

(No Model.) 3 Sheets—Sheet 3.
F. B. BADT.
ELECTRIC LOCOMOTIVE.
No. 549,485. Patented Nov. 12, 1895.
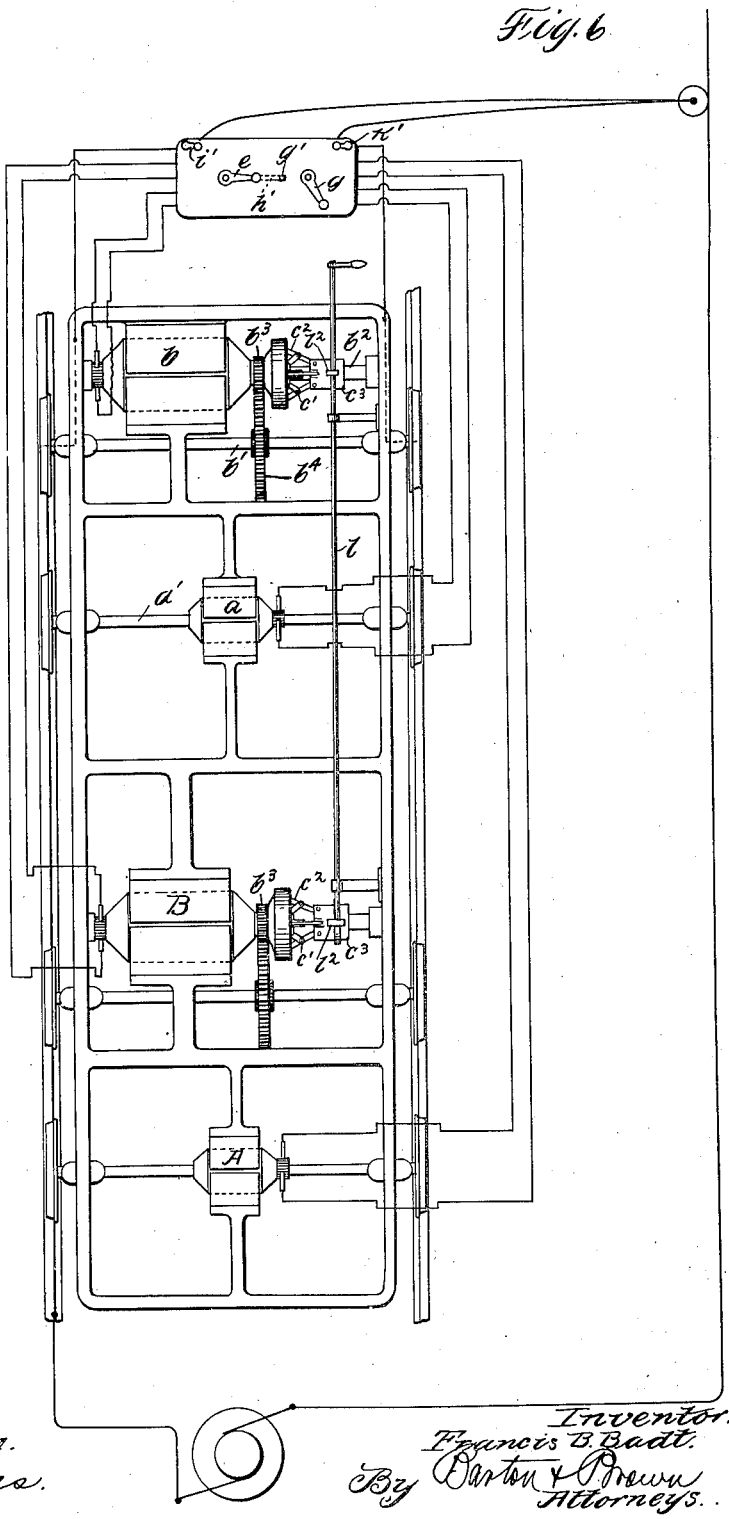
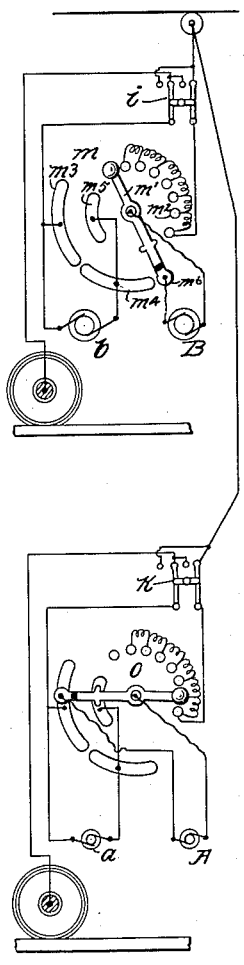
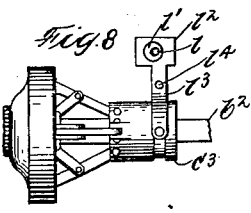
Witnesses
George L. Cragg.
W. Clyde Jones.
Inventor:
Francis B. Badt.
By Barton & Brown
Attorneys.

UNITED STATES PATENT OFFICE.

FRANCIS B. BADT, OF CHICAGO, ILLINOIS, ASSIGNOR TO THE SIEMENS & HALSKE ELECTRIC COMPANY OF AMERICA, OF SAME PLACE.

ELECTRIC LOCOMOTIVE.

SPECIFICATION forming part of Letters Patent No. 549,485, dated November 12, 1895.

Application filed August 1, 1895. Serial No. 557,838. (No model.)

*To all whom it may concern:*

Be it known that I, FRANCIS B. BADT, a citizen of the United States, residing at Chicago, in the county of Cook and State of Illinois, have invented new and useful Improvements in Electric Railways, of which the following is a specification.

My invention relates to an electric car or vehicle; and its object is to construct a vehicle in which the electrical equipment will be more efficient than in constructions heretofore employed.

It is a well-known fact that considerably more power is required to start a car or train from rest than is required when the car or train is running at normal speed. Actual tests have demonstrated that under average conditions and with a fairly straight and level track only about one-seventh of the power required at starting is necessary when running at normal speed. It has been customary heretofore to employ one motor or a pair of motors both for starting and for propelling the car, and it is necessary to make the motors seven times larger than is actually necessary for running at normal speed. Consequently the motors operate very inefficiently for the greater portion of the time, since the greatest efficiency is obtained when running at or near full load. The usual method which has been used to overcome this objection in a measure has been by providing upon each car two motors adapted to be run in series at starting and then to be thrown into parallel for running at higher speeds; but even when thus employed the capacities of the motors when in parallel are much too great for the ordinary work.

In accordance with my invention I provide in connection with each car or unit two motors, one large motor, which I term the "starting-motor," having sufficient capacity to start the car in motion, and a small motor, which I term the "speed-motor," the capacity of which is sufficient to propel the car at normal speed. I preferably mount the two motors upon the axles of a single truck, the smaller motor being preferably mounted directly upon the axle without intermediate gearing, while the larger motor is connected to the other axle by means of intermediate gearing through a mechanical clutch by means of which it may be thrown into and out of gear.

When it is desired to start the car, the starting-motor is thrown into gear to start the car in motion, after which the speed-motor may be thrown into circuit to propel the car, the starting-motor being thrown out of gear and disconnected from circuit. The speed-motor may or may not be used to assist the starting-motor, as may be desired. In order to avoid mistakes and render the operation certain, I preferably provide two operating-levers—one for the starting-motor and the other for the speed-motor—a lock being provided which prevents the movement of the operating-lever of the speed-motor beyond a certain point until after the operating-lever of the starting-motor has been moved to a position to cut the same out of circuit and disconnect it mechanically.

In the preferred form of my invention I provide, in connection with each car or unit two starting-motors and two speed-motors, switching devices being provided whereby the two starting-motors may be connected first in series and then connected in multiple, after which the speed-motors may be thrown into circuit, first in series and subsequently in multiple.

By the employment of my invention high efficiency is obtained between stations, the two classes of work—starting and running at high speed—benig done by different motors, each designed and geared for the highest economy and efficiency for the particular class of work. The capacity of the two motors combined is no greater than the capacity of the single motor as heretofore employed for doing the same work, and taking into consideration the simplified method of starting and operating, the first cost of the apparatus for an equal amount of work is not increased, the efficiency is greatly increased, and the cost of operating decreased, while the fluctuations of the ampèrage at the power-station are much smaller than in systems as at present employed.

My invention is particularly adapted to heavy trains run at high speeds—as, for instance, where it is proposed to convert an existing steam-road into an electric road. The difference between the power required to start such a heavy train and the power required to maintain it in motion at normal speed is much greater than in the case of an ordinary street-railway, and in consequence the employment of my invention in this connection would result in even a greater saving than in its application to street-railways where trains are lighter and run at lower speeds. In applying my invention to such trains I prefer a number of motor-cars in a train to a single locomotive, say one motor-car to each three trailers, so that if a train should consist of twelve coaches three of them would be motor-cars and the other nine trailers. By distributing the weight necessary for the traction over a number of motor-cars, instead of having a single locomotive, a large saving is effected in repairs of the track, while in an elevated structure a large amount of money may be saved in the construction, as a lighter structure may be employed. By employing a system of electrical and mechanical connections between the first motor-car and the other motor-cars of a train, (as shown, for instance, in application, Serial No. 561,222, filed September 3, 1895,) the motorman on the first motor-car may govern all of the motors on the train. The first motor-car alone may be provided with a trolley device, or each of the motor-cars may have its independent trolley. For carrying heavy currents, as required for fast suburban traffic, I should preferably employ trolley devices shown in Letters Patent No. 322,859, dated July 21, 1885, and No. 520,274, dated May 22, 1894.

I will describe my invention in detail by reference to the accompanying drawings, in which—

Figure 2:
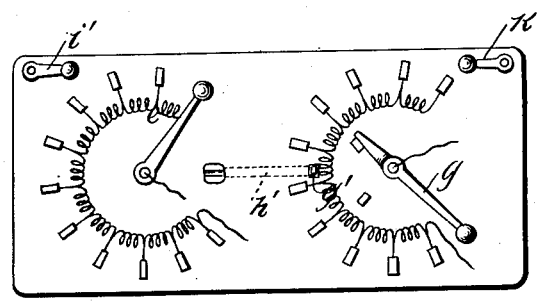
Figure 3:
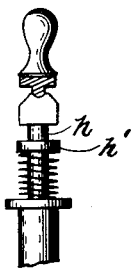
Figure 4:
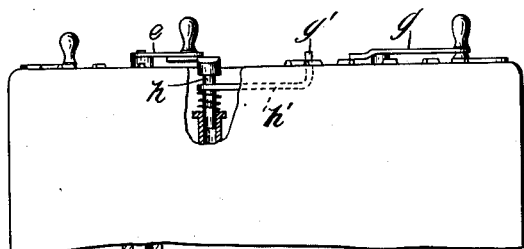
Figure 5:
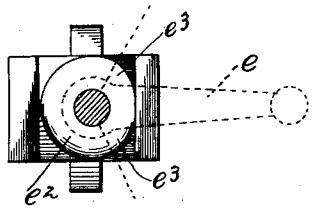

Figure 1 is a plan view of a motor-truck equipped after the manner of my invention, the circuit connections being shown in diagram. Fig. 2 is a view of the operating-levers for controlling the motors. Fig. 3 is a detail view of the locking device controlled by the operating-lever of the starting-motor. Fig. 4 is a view illustrating the mechanism controlled by the operating-levers. Fig. 5 is an enlarged sectional view upon line 5 5 of Fig. 4. Fig. 6 is a plan view of a car or unit provided with two starting and two speed motors, the circuit connections being illustrated in diagram. Fig. 7 is a diagram showing the circuit connections and switches for controlling the circuits through the several motors. Fig. 8 is a detail view of the clutch mechanism for controlling the starting-motors.

Like letters refer to like parts in the several figures.

I preferably mount the speed-motor $a$ directly upon one of the axles $a'$ of the car-truck, while the starting-motor $b$, I preferably connect with the other axle $b'$ through intermediate gearing. As illustrated in Fig. 1, the armature of the motor $b$ is mounted upon a shaft $b^2$, upon which shaft is loosely mounted a gear-wheel $b^3$, meshing with a gear-wheel $b^4$, provided upon the axle $b'$. A clutch is provided for connecting the gear-wheel $b^3$ with the axle $b^2$ or disengaging the same therefrom. The clutch, as illustrated more clearly in Fig. 4, comprises a collar $c$, secured to the shaft $b^2$, to which are pivoted links $c'$ $c'$, connected at their ends with levers $c^2$ $c^2$, pivoted to a sliding collar $c^3$. A lever $d$, pivoted at $d'$, engages by its end the collar $c^3$, whereby, as said lever is rotated, the collar is thrust forward to cause the ends of arms $c^2$ $c^2$ to engage projections provided upon the interior of the wheel $b^5$, or when rotated in the opposite direction to be disengaged therefrom. The operating-lever $e$ is mounted on the end of a shaft $e'$, carrying upon its end the cam $e^2$, adapted to engage the walls of a recess provided in the end of the lever $d$, whereby the lever $d$ may be rocked by the rotation of the operating-lever. As illustrated in Fig. 5, a considerable portion of the periphery of the cam $e^2$ is concentric, while portions $e^3$ $e^3$ of the periphery are eccentric.

When the operating-lever $e$ occupies the position illustrated in Fig. 5, the upper end of lever $d$ occupies its extreme position to the left and the collar $c^3$ its extreme position to the right, the clutch being thus disengaged. When the operating-lever is rotated, the upper end of lever $d$ is moved to the right by the engagement of the eccentric portion $e^3$ of the cam $e^2$, and the collar $c^3$ is thus thrust to the left to throw the clutch into engagement. Further rotation of the operating-lever $e$ does not affect the clutch, as the concentric portion of the cam $e^2$ is now in engagement with the walls of the recess provided in the end of said lever $d$. The contact-arm $f'$ of the rheostat $f$ (illustrated in Fig. 1) is connected with the operating-lever $e$ of Fig. 4, so that after the clutch has been thrown by the initial rotation of the lever $e$ further rotation of said lever acts to cut resistance from the motor-circuit, the engagement of the concentric portion of the cam with the lever $d$ maintaining the clutch in engagement, notwithstanding the rotation of the operating-lever.

In Fig. 2 I have illustrated the operating-lever $e$ serving as the contact-arm of the rheostat, the lever $e$ when resting in its initial position serving to open the circuit. When the lever $e$ is moved to engagement with the first contact-terminal, the circuit through the motor is closed with all the resistance of the rheostat in circuit. As the movement of the operating-lever $e$ is continued, the resistance is cut out step by step. When the operating-lever is moved in the opposite direction, resistance is cut in step by step, and upon the final movement of the operating-lever to its initial position the circuit of the motor is opened.

The operating-lever $g$ (Figs. 2 and 4) for the speed-motor is adapted to engage a stop $g'$ after being rotated to a certain distance, and cannot be moved farther until the operating-lever $e$ of the starting-motor has been moved to its initial position, thus cutting out the starting-motor and disconnecting the same through the agency of the clutch. When the operating-lever $e$ is moved to its initial position, it engages and depresses rod $h$, which carries the arm $h'$, upon the end of which is provided a stop $g'$. When the rod $h$ is depressed, the stop $g'$ is also depressed, and the further movement of operating-lever $g$ is permitted.

As illustrated in Fig. 1, a reversing-switch $i$ is provided in the circuit of the starting-motor and a reversing-switch $k$ in the circuit of the speed-motor, whereby the direction of rotation may be reversed. The usual rheostat $p$ is provided in the circuit of the speed-motor.

In Fig. 2 I have indicated the reversing-switches $i$ and $k$ by the levers $i'$ $k'$, adapted to operate the same, but in practice the levers of the reversing-switch and the operating-levers may be combined, as is customary in controlling devices now in use.

When it is desired to start the car, the operating-lever $e$ is moved from its initial position—say to the left—thus throwing the starting-motor into gear through the agency of the clutch. As the rotation of the operating-lever is continued, resistance is cut out of circuit and the speed increases. When all of the resistance has been cut out of the circuit of the starting-motor, the operating-lever $e$, it may be assumed, will rest at the position illustrated in Fig. 2. The operating-lever $g$ of the speed-motor may then be moved to the left to cut the speed-motor into circuit and to gradually cut out resistance. When the operating-lever $g$ comes in contact with the stop $g'$, the speed-motor will have reached such a speed as will permit it to propel the car alone, and at this point the operating-lever $e$ may be moved to its initial position, thus cutting the starting-motor from circuit and throwing the same out of gear through the agency of the clutch. By the same movement the stop $g'$ is depressed and the further movement of the operating-lever $g$ is permitted, to further remove resistance from the circuit of the speed-motor. By this arrangement of operating-levers the disconnection of the starting-motor from the circuit is necessitated at a predetermined speed, it being necessary for the disconnection of the starting-motor before further resistance may be cut from the circuit of the speed-motor.

In Figs. 6 and 7 I have illustrated my invention in connection with a car in which two starting-motors $b$ B are provided, clutches being provided adapted to be operated together for simultaneously connecting or disconnecting the motors. The clutches are operated by means of a rotating rod $l$, carrying an eccentric $l'$, Fig. 8, opposite each clutch, the strap $l^2$ of the eccentric being mounted upon the end of a lever $l^3$, pivoted at $l^4$, and engaging by its end the sliding collar $c^3$, that controls the clutch. Two speed-motors $a$ A are also provided. As illustrated in Fig. 7, the starting motors $b$ B are connected in circuit with a reversing-switch $i$, whereby the direction of the current may be reversed, and with a series-multiple switch $m$, whereby the motors may be first connected in series and subsequently in multiple. The series-multiple switch may be of any desired construction. I have illustrated a pivoted arm $m'$, adapted to engage the series of terminals $m^2$ of the rheostat. The circuit from one side of the reversing-switch $i$ passes to the terminal $m^3$ and thence to the motor $b$, circuit then extending to the terminals $m^4$ and $m^5$. One side of the motor B is connected with the arm $m'$ and the other with the terminal $m^6$, carried upon the end thereof, but insulated therefrom. When the terminal $m^6$ rests upon the terminal $m^4$, the motors are connected in series, and when terminal $m^6$ rests upon the terminal $m^3$ the motors are connected in multiple. The rheostat-terminals $m^2$ are preferably arranged so that as the arm is moved resistance is first cut out, step by step, after which the circuit arrangement of the motors is changed from series to multiple, and as the arm continues its movement, further resistance is cut out, step by step. The speed-motors $a$ A are likewise connected in circuit with a reversing-switch $k$ and a series-multiple switch $o$. In starting the car from rest the reversing-switch $i$ is operated to direct the current through the motors in the proper direction, after which the arm of the series-multiple switch is moved to connect the motors $b$ B in series, after which the motors are connected in multiple. The reversing-switch $k$ is then operated to direct the current through the speed-motors in the proper direction, after which the arm of the series-multiple switch $o$ is operated, first to connect the speed-motors in series and then in multiple, the starting-motors $b$ B being cut from the circuit after the speed-motors have reached a predetermined speed.

In Fig. 7 the operating-lever of the speed-motors is shown as unaffected by the movement of the operating-lever of the starting-motors, but when desired the two operating-levers may be connected after the manner illustrated in Figs. 2 and 4, whereby the operating-lever of the speed-motors cannot be moved until after the operating-lever of the starting-motors has been moved to cut out the starting-motors.

Having described my invention, what I claim as new, and desire to secure by Letters Patent, is—

1. In an electrically propelled vehicle, the combination with a starting motor for starting the vehicle from rest, of a speed motor for propelling the vehicle at normal speed; substantially as described.

2. In an electrically propelled vehicle, the combination with a starting motor having a capacity at maximum efficiency sufficient to start the car from rest, of a speed motor having a capacity at maximum efficiency sufficient for propelling the vehicle at normal speed; substantially as described.

3. In an electrically propelled vehicle, the combination with a starting motor, of a speed motor, means for connecting the starting motor in circuit, and means for subsequently connecting the speed motor into circuit and for disconnecting the starting motor; substantially as described.

4. In an electrically propelled vehicle, the combination with a starting motor or motors, of a speed motor or motors, controlling apparatus for first connecting the starting motor or motors in circuit, means for subsequently connecting the speed motor or motors in circuit, and a locking device for preventing the increase of the speed of the speed motor or motors above a predetermined point without disconnecting the starting motor or motors; substantially as described.

5. In an electrically propelled vehicle, the combination with a starting motor or motors, of a speed motor or motors, an operating lever for controlling the circuit through the starting motor or motors, an operating lever for controlling the circuit through the speed motor or motors, and a lock for preventing the movement of the operating lever of the speed motor or motors beyond a predetermined point until after the operating lever of the starting motor or motors has been moved to disconnect the starting motor or motors; substantially as described.

6. In an electrically propelled vehicle, the combination with a speed motor mounted directly upon the vehicle axle, of a starting motor connected with an axle of the vehicle through intermediate gearing, and a clutch for connecting and disconnecting the starting motor; substantially as described.

7. In an electrically propelled vehicle, the combination with two starting motors, of two speed motors, a series-multiple switch for connecting the starting motors first in series and then in multiple, and a series-multiple switch for connecting the speed motors first in series and subsequently in multiple; substantially as described.

8. In an electrically propelled vehicle, the combination with a plurality of speed motors, each mounted directly upon an axle of the vehicle, of a plurality of starting motors connected with the axles through intermediate gearing, a clutch for each of said starting motors, means for simultaneously connecting or disconnecting the starting motors, means for connecting the starting motors in circuit, and means for subsequently connecting the speed motors in circuit and for disconnecting the starting motors from the circuit; substantially as described.

9. In an electrically propelled vehicle, the combination with a starting motor, of a speed motor, an operating lever and a clutch and rheostat for the starting motor controlled by said operating lever; substantially as described.

10. In an electrically propelled vehicle, the combination with a motor, of an operating lever, and a clutch and a circuit opener controlled by said operating lever for disconnecting said starting motor both mechanically and electrically; substantially as described.

In testimony whereof I affix my signature in the presence of two witnesses.

FRANCIS B. BADT.

Witnesses:
CHARLES A. BROWN,
JOHN W. SINCLAIR.